United States Patent
Schumacher et al.

(10) Patent No.: US 7,439,298 B2
(45) Date of Patent: Oct. 21, 2008

(54) PYROGENICALLY PRODUCED SILICON DIOXIDE POWDER AND SILICONE SEALING COMPOUND CONTAINING THIS POWDER

(75) Inventors: Kai Schumacher, Hofheim (DE); Dieter Kerner, Hanau (DE); Uwe Diener, Grosskrotzenburg (DE); Mario Scholz, Gruendau (DE)

(73) Assignee: Degussa AG, Duesseldorf (DE)

( * ) Notice: Subject to any disclaimer, the term of this patent is extended or adjusted under 35 U.S.C. 154(b) by 250 days.

(21) Appl. No.: 11/084,022

(22) Filed: Mar. 21, 2005

(65) Prior Publication Data

US 2006/0155042 A1    Jul. 13, 2006

(30) Foreign Application Priority Data

Jan. 12, 2005    (DE) ................ 10 2005 001 409

(51) Int. Cl.
*C08K 3/34* (2006.01)
(52) U.S. Cl. .................. 524/588; 524/492; 523/513; 423/335; 423/337; 423/355
(58) Field of Classification Search ............... 524/588, 524/492; 523/513; 423/335, 337, 355
See application file for complete search history.

(56) References Cited

U.S. PATENT DOCUMENTS

| 6,593,270 | B1* | 7/2003 | Krause et al. ............... 502/328 |
| 2004/0253164 | A1 | 12/2004 | Mangold et al. | |
| 2006/0154994 | A1* | 7/2006 | Schumacher et al. .......... 516/81 |
| 2008/0045411 | A1* | 2/2008 | Morters et al. .............. 502/232 |

FOREIGN PATENT DOCUMENTS

| DE | 102 58 858 A1 | 8/2004 |
| EP | 1 486 461 A1 | 12/2004 |
| WO | WO 2005/054928 A1 | 6/2005 |
| WO | WO 2005/095503 A1 | 10/2005 |

OTHER PUBLICATIONS

U.S. Appl. No. 11/055,605, filed Feb. 11, 2005, Schumacher, et al.
U.S. Appl. No. 10/524,037, filed Feb. 9, 2005, Schumacher, et al.
U.S. Appl. No. 11/084,022, filed Mar. 21, 2005, Schumacher, et al.
U.S. Appl. No. 11/084,022, filed Mar. 21, 2005, Schumacher, et al.
U.S. Appl. No. 11/084,170, filed Mar. 21, 2005, Schumacher, et al.
U.S. Appl. No. 11/085,151, filed Mar. 22, 2005, Schumacher, et al.
U.S. Appl. No. 10/530,284, filed Apr. 5, 2005, Moerters, et al.
U.S. Appl. No. 10/530,491, filed Apr. 6, 2005, Moerters, et al.
U.S. Appl. No. 10/549,929, filed Sep. 20, 2005, Schumacher, et al.

* cited by examiner

*Primary Examiner*—Robert D. Harlan
(74) *Attorney, Agent, or Firm*—Oblon, Spivak, McClelland, Maier & Neustadt, P.C.

(57) ABSTRACT

Pyrogenically produced silicon dioxide powder in the form of aggregates of primary particles having a BET surface area of $150\pm15$ m$^2$/g, wherein the aggregates display an average surface area of 12000 to 20000 nm$^2$, an average equivalent circle diameter (ECD) of 90 to 120 nm and an average circumference of 1150 to 1700 nm. It is produced by a pyrogenic process in which silicon tetrachloride and a second silicon component comprising $H_3SiCl$, $H_2SiCl_2$, $HSiCl_3$, $CH_3SiCl_3$, $(CH_3)_2SiCl_2$, $(CH_3)_3SiCl$ and/or $(n-C_3H_7)SiCl_3$ are mixed with primary air and a combustion gas and burnt into a reaction chamber, secondary air also being introduced into the reaction chamber, and the feed materials being chosen such that an adiabatic flame temperature of 1670 to 1730° C. is obtained. Silicone sealing compound containing the pyrogenically produced silicon dioxide powder.

8 Claims, No Drawings

PYROGENICALLY PRODUCED SILICON DIOXIDE POWDER AND SILICONE SEALING COMPOUND CONTAINING THIS POWDER

BACKGROUND OF THE INVENTION

FIELD OF THE INVENTION

The invention concerns a pyrogenically produced silicon dioxide powder, its production and use. The invention also concerns a silicone sealing compound containing the pyrogenically produced silicon dioxide powder.

Flame hydrolysis for the production of silicon dioxide is a process that has long been known and is performed on an industrial scale. In this process an evaporated or gaseous hydrolysable silicon halide is mixed with a flame formed by burning a water-forming, hydrogen-containing fuel and an oxygen-containing gas. The combustion flame provides water for hydrolysis of the silicon halide and sufficient heat for the hydrolysis reaction. The silicon dioxide powder carried in the residual reaction gases is subjected to conventional cooling and solids separation processes. Silicon tetrachloride is usually used. The use of dichlorosilane, trichlorosilane is also known, however. If carbon-containing feed materials are used, such as e.g. methyl trichlorosilane, dimethyl dichlorosilane, methyl dichlorosilane, dibutyl dichlorosilane, ethyl trichlorosilane, propyl trichlorosilane, an oxidation process to convert the carbon into carbon dioxide also takes place.

As a consequence, a silicon dioxide powder which is formed in a process wherein both reaction types, namely flame hydrolysis and oxidation, take place is described as a pyrogenically produced silicon dioxide.

In the reaction, highly dispersed, non-porous primary particles are initially formed, which as the reaction continues coalesce to form aggregates which in turn can congregate to form agglomerates. The BET surface area of these primary particles is generally between 5 and 600 $m^2/g$. The powder displays free hydroxyl groups on its surface.

The silicon dioxide powder produced in this way is used in many areas of application. Of particular importance is its use as a means of controlling rheology in silicone rubbers. Due to its excellent thickening action, pyrogenically produced silicon dioxide powder has long been used in silicone rubbers. In addition to the thickening action, great importance is also attached to the incorporation ability into the silicone polymer. In the case of silicon dioxide powders produced by the prior art, often only one of the parameters, thickening action and incorporation ability, is within the desired range. Furthermore, the individual parameters, thickening and incorporation ability, are also in need of improvement.

SUMMARY OF THE INVENTION

The object of the invention is therefore to provide a silicon dioxide powder displaying a good thickening action combined with a short incorporation time and good dispersibility in polymers, particularly silicone polymers. In addition, the silicone polymers should also display a good surface finish after incorporation of the silicon dioxide powder.

A further object of the invention is to provide a process for the production of the silicon dioxide powder.

A further object of the invention is to provide a silicone sealing compound containing the silicon dioxide powder according to the invention.

DETAILED DESCRIPTION OF THE PREFERRED EMBODIMENTS

The invention provides a pyrogenically produced silicon dioxide powder in the form of aggregates of primary particles, which has a BET surface area of 150±15 $m^2/g$ and in which the aggregates display an average surface area of 12000 to 20000 $nm^2$, an average equivalent circle diameter (ECD) of 90 to 120 nm and an average circumference of 1150 to 1700 nm.

The BET surface area is determined here in accordance with DIN 66131.

The aggregate sizes are determined by image analysis using an H 7500 TEM device supplied by Hitachi and a MegaView II CCD camera supplied by SIS. The image magnification for analysis is 30000:1 with a pixel density of 3.2 nm. The number of particles analysed is greater than 1000. Preparation takes place in accordance with ASTM 3849-89. The lower threshold limit in terms of detection is 50 pixels.

The BET surface area can preferably be 150±10 $m^2/g$ and particularly preferably 150±5 $m^2/g$.

Furthermore, a pyrogenically produced silicon dioxide powder according to the invention can be preferred in which the aggregates display an average surface area of 12500 to 14500 $nm^2$, an average equivalent circle diameter of 95 to 110 nm and an average circumference of 1250 to 1450 nm.

Furthermore, a pyrogenically produced silicon dioxide powder according to the invention can be preferred in which the maximum aggregate diameter is between 170 and 240 nm and the minimum aggregate diameter is between 100 and 160 nm.

Furthermore, a pyrogenically produced silicon dioxide powder according to the invention can be preferred in which the chloride content is less than 250 ppm. A chloride content of less than 50 ppm is particularly preferred.

Furthermore, a pyrogenically produced silicon dioxide powder according to the invention can be preferred in which the carbon content is less than 100 ppm. A carbon content of less than 25 ppm is particularly preferred.

The invention also provides a process for the production of the silicon dioxide powder according to the invention wherein a mixture of silicon compounds is evaporated, separately or together, the vapours are transferred by means of a carrier gas to a mixing chamber, with $SiCl_4$ as the first component in a proportion of 60 to 95 wt. % relative to the mixture, and a second component chosen from the group comprising $H_3SiCl$, $H_2SiCl_2$, $HSiCl_3$, $CH_3SiCl_3$, $(CH_3)_2SiCl_2$, $(CH_3)_3SiCl$, $(n-C_3H_7)SiCl_3$, in a proportion of 5 to 40 wt. %, relative to the mixture, and a combustion gas and primary air, which can optionally be enriched with oxygen and/or be preheated, are transferred separately to the mixing chamber, the mixture of the vapour of silicon chlorides, combustion gas and primary air is ignited in a burner and the flame burns into a reaction chamber, secondary air, which surrounds the flame, is introduced into the reaction chamber, the ratio of secondary air to primary air being in a range from 0.05 to 3, preferably 0.15 to 2, the solid is then separated from gaseous substances and the solid is then steam-treated at 250° C. to 750° C., wherein the total amount of oxygen is at least sufficient for the complete combustion of the combustion gas and the silicon compounds and the amount of feed materials consisting of silicon compounds, combustion gas, primary air and secondary air is chosen such that an adiabatic flame temperature $T_{ad}$ of 1670 to 1730° C. is obtained, where $T_{ad}$=the temperature of the feed materials+the sum of the reaction enthalpies of the partial reactions/heat capacity of the substances leaving the reaction chamber, comprising silicon dioxide, water, hydrogen chloride, carbon dioxide, oxygen, nitrogen, and optionally the carrier gas if it is not air or nitrogen, taking the specific heat capacity of these substances at 1000° C. as a basis.

The specific heat capacities can be determined with the aid of the VDI-Wärmeatlas , for example (section 7.1 to 7.3 and 3.7, 8$^{th}$ edition).

The reaction of the silicon compounds in the presence of oxygen and a combustion gas yields silicon dioxide, water, hydrochloric acid and, in the case of carbon-containing silicon compounds and/or carbon-containing combustion gases, carbon dioxide. The reaction enthalpies of these reactions can be calculated by means of standard works known to the person skilled in the art.

Table 1 shows selected reaction enthalpy values for the reaction of silicon compounds in the presence of hydrogen and oxygen.

TABLE 1

Reaction enthalpies

| | KJ/mol |
|---|---|
| $H_2$ | −241.8 |
| $SiCl_4$ | −620.1 |
| $SiHCl_3$ | −659.4 |
| $SiH_2Cl_2$ | −712.3 |
| $n-C_3H_7SiCl_3$ | −2700.2 |
| $CH_3SiCl_3$ | −928.3 |
| $(CH_3)_3SiCl$ | −2733.8 |

Methyl trichlorosilane (MTCS, $CH_3SiCl_3$), trichlorosilane (TCS, $SiHCl_3$) and/or n-propyl trichlorosilane (PTS, $n-C_3H_7SiCl_3$) can particularly preferably be used.

Suitable combustion gases are hydrogen, methane, ethane, propane and/or natural gas, with hydrogen being preferred.

There is no restriction on the temperature of the feed materials, provided that it is above the boiling point of the highest boiling silicon compound. A temperature of the feed materials of 90° C.±40° C. has proved to be advantageous.

It can also be advantageous if the discharge velocity of the reaction mixture from the mixing chamber into the reaction chamber is 10 to 80 m/s.

The invention also provides the use of the pyrogenically produced silicon dioxide powder according to the invention as a filler in rubber and plastics, to adjust the rheology in paints and coatings, as a support for catalysts and to produce dispersions.

The invention also provides a silicone sealing compound containing the silicon dioxide powder according to the invention.

This can preferably be an RTV-1 or RTV-2 silicone rubber. The silicone sealing compound containing 8 wt. % of a silicon dioxide powder according to the invention can preferably display a viscosity of at least 120 Pas.

EXAMPLES

The BET surface area is determined in accordance with DIN 66131.

Determining the wet-in performance: 100 g of Silopren C 5 (Bayer AG) are placed in a 200 ml PE beaker. The beaker is placed snugly in the tray of the constant temperature vessel of a high-speed mixer. The high-speed mixer with a 30 mm disc diameter is set to a speed of 500 rpm and 2 g of the silicon dioxide powder are poured onto the polymer surface and the stopwatch is started. The time taken to homogenise the silicon dioxide powder with the polymer is measured.

Production of Silicon Dioxide Powders

Example 1

100 kg/h of silicon tetrachloride, 5 kg/h of trichlorosilane and 35 kg/h of methyl trichlorosilane are evaporated and transferred to the mixing chamber of a burner by means of nitrogen. At the same time, 35 Nm³/h of hydrogen and 155 Nm³/h of primary air are introduced into the mixing chamber. The mixture displays a temperature of 90° C. It is ignited and burnt into a reaction chamber in a flame. In addition, 25 Nm³/h of secondary air, which surrounds the flame, are introduced into the reaction chamber.

The reaction gases and the silicon dioxide that is formed are drawn through a cooling system by application of a partial vacuum, cooling them to values between 100 and 160° C. The solid is separated from the waste gas stream in a filter or cyclone and then steam-treated at a temperature of 550° C.

Examples 2 to 11 are performed in the same way.

Table 2 reproduces the feed materials and the amounts from Examples 1 to 11.

Table 3 shows the calculated values for reaction enthalpy, heat capacity and adiabatic flame temperature.

Table 4 shows analytical data for the silicon dioxide powders produced, and for two commercially available pyrogenically produced silicon dioxide powders (Examples 12 and 13).

Examples 1 to 5 produce powders according to the invention. Examples 5 to 10 are comparative examples.

In Example 2 three silicon components are used.

In Examples 3 and 4, high and low proportions of the first silicon component, silicon tetrachloride, are used respectively.

In Example 5 a high ratio of secondary air to primary air within the claimed range is established.

In Examples 6 and 7 settings are chosen which lead to an adiabatic flame temperature outside the claimed range.

In Example 8 only one silicon compound ($SiCl_4$) is used.

In Example 9 the ratio of silicon tetrachloride to the other silicon compounds is outside the claimed range.

In Example 10 no secondary air is introduced.

In Example 11 the ratio of secondary air to primary air is outside the claimed range.

Production of a Silicone Sealing Compound

Equipment: The planetary mixer/high-speed mixer fulfils the following requirements: The mixing vessel has a capacity of approx. 2 liters and is equipped with a double jacket having a cooling water connection. The planetary drive and high-speed mixer drive are independent. A vacuum pump is present. An additional drum press simplifies the filling process.

Formulation:
62.4 wt. % silicone polymer (Silopren E 50),
24.6 wt. % silicone oil (silicone oil M 1000),
4.0 wt. % acetate crosslinker (crosslinker AC 3034),
1.0 wt. % coupling agent (AC 3001)
0.01 wt. % dibutyl tin diacetate catalyst, all GE Bayer Silicones, and
8.0 wt. % silicon dioxide powder Procedure: 468.0 g of silicone polymer, 184.5 g of silicone oil, 30.0 g of crosslinker, 7.5 g of coupling agent are weighed into a stirring vessel and homogenised for 1 minute at a speed of 50 min$^{-1}$ by means of the planetary mixer and of 500 min$^{-1}$ by means of the high-speed mixer.

60 g of silicon dioxide powder are then incorporated at the same speed in 2 stages of 30 g each.

As soon as the silicon dioxide powder is completely wetted, a vacuum of approx. 200 mbar is applied and the mixture is dispersed for 5 minutes at a speed of 100 min$^{-1}$ (planetary mixer) and 2000 min$^{-1}$ (high-speed mixer) whilst being cooled. Dibutyl tin diacetate is then added and the mixture is dispersed for a further 5 minutes.

The silicone sealing compound is introduced into aluminium tubes using a drum press.

Determining the viscosity of the silicone sealing compound: Using a rheometer a flow curve is plotted by means of a measuring system (cone and plate) and the viscosity and yield point determined. The viscosity is read from the flow curve at 10 s$^{-1}$ (shear rate). The viscosity describes the property of a substance to flow under the action of a stress and to be irreversibly deformed. Since in the case of non-Newtonian flow properties the viscosity is dependent on the shear rate, it is specified at a defined shear rate of 10 s$^{-1}$.

The examples show that the silicon dioxide powder according to the invention from Examples 1 to 5 displays markedly shorter wetting times and a markedly greater thickening action than the samples from comparative examples 6 to 13.

The examples also show that the average aggregate surface area, the average ECD, the average aggregate circumference, the average maximum aggregate diameter and the average minimum aggregate diameter of the silicon dioxide powders according to the invention are smaller than the corresponding values for the comparative examples, with the exception of the commercially available silicon dioxide powder from Example 13. In this case the average aggregate surface area and the average aggregate circumference are smaller than in the silicon dioxide powders from the examples according to the invention, but the wetting time is longer and the thickening action is less strong.

Examples 1 to 5 also show how a specific narrow adiabatic flame temperature range, in this case 1671° C. to 1708° C., can be obtained by varying the amounts of feed materials.

Comparative examples 6 and 7 also show that with the same composition of silicon compounds as in Example 1, silicon dioxide powders according to the invention are not obtained. The powders obtained display BET surface areas outside the claimed range. In comparative examples 6 and 7, the adiabatic flame temperatures are outside the claimed range.

In comparative examples 8 to 10, the adiabatic flame temperatures are within the claimed range, but silicon dioxide powders according to the invention are not obtained:

In Examples 8 to 10 the composition of the silicon compounds is outside the claimed range. As Table 4 shows, powders are obtained whose average aggregate surface areas, average ECD, average aggregate circumferences, average maximum aggregate diameters and average minimum aggregate diameters are larger than those of the silicon dioxide powders according to the invention.

In Example 11 the ratio of secondary air to primary air of 4.08 is outside the claimed range. The silicon dioxide powder obtained displays a BET surface area that is well outside the claimed range.

The silicone sealing compound containing the silicon dioxide powders according to the invention displays a good to very good dispersibility in the silicone polymer. The surface finish of the silicone sealing compound is likewise good to very good. The assessment is made visually, where 1=very good, 2=good, 3=satisfactory, 4=adequate.

TABLE 2

| | | Feed materials and amounts used | | | | | | | | | | |
|---|---|---|---|---|---|---|---|---|---|---|---|---|
| | | According to the invention | | | | | Comparison | | | | | |
| Example | | 1 | 2 | 3 | 4 | 5 | 6 | 7 | 8 | 9 | 10 | 11 |
| Silicon tetrachloride | kg/h | 100 | 100 | 168 | 98 | 9 | 100 | 100 | 170 | 10 | 100 | 9 |
| 2nd silicon component$^{(\$)}$ | kg/h | TCS 5 | MTCS 50 | TCS 30 | MTCS 60 | PTS 1 | MTCS 50 | MTCS 50 | 0 | PTS 100 | TCS 5 | PTS 1 |
| 3rd silicon component$^{(\$)}$ | kg/h | MTCS 35 | 0 | 0 | 0 | 0 | 0 | 0 | 0 | 0 | MTCS 35 | 0 |
| Hydrogen | Nm$^3$/h | 35 | 40 | 70 | 48 | 3.2 | 35 | 45 | 66 | 9 | 35 | 6.2 |
| Primary air | Nm$^3$/h | 155 | 185 | 240 | 265 | 5 | 185 | 185 | 175 | 535 | 180 | 4.9 |
| Secondary air | Nm$^3$/h | 25 | 36 | 15 | 15 | 10 | 36 | 36 | 36 | 36 | 0 | 20 |
| Secondary air/primary air | | 0.16 | 0.19 | 0.06 | 0.06 | 2 | 0.19 | 0.19 | 0.21 | 0.07 | — | 4.08 |
| Inlet temperature(*) | ° C. | 90 | 90 | 90 | 90 | 90 | 90 | 90 | 90 | 90 | 90 | 90 |
| $V_{burner}^{(+)}$ | m/s | 29.6 | 34.2 | 46.6 | 46.3 | 33.7 | 33.6 | 34.9 | 36.7 | 47.9 | 33.2 | 36.3 |

(*) For mixture of H$_2$, primary air, SiCl$_4$, 2$^{nd}$ and optionally 3$^{rd}$ silicon component
$^{(\$)}$MTCS = methyl trichlorosilane; TCS = trichlorosilane; DCS = dichlorodisilane, MTS = methyl trichlorosilane;
$^{(+)}$discharge velocity from burner

TABLE 3

Reaction enthalpy, heat capacity and adiabatic flame temperature

| | | According to the invention | | | | | Comparison | | | | | |
|---|---|---|---|---|---|---|---|---|---|---|---|---|
| Example | | 1 | 2 | 3 | 4 | 5 | 6 | 7 | 8 | 9 | 10 | 11 |
| Sum of reaction enthalpies from partial reactions | KW | −192.0 | −228.6 | −273.2 | −269.4 | −15.9 | −213.6 | −243.6 | −235.9 | −452.2 | −192.0 | −24.9 |
| Heat capacity of products | KJ/s · K | 0.12 | 0.14 | 0.17 | 0.17 | 0.01 | 0.14 | 0.14 | 0.14 | 0.28 | 0.12 | 0.02 |
| Adiabatic flame temperature | °C. | 1706 | 1708 | 1698 | 1671 | 1707 | 1620 | 1794 | 1724 | 1680 | 1717 | 1722 |

TABLE 4

Analytical data for silicon dioxide powders

| | | According to the invention | | | | | Comparison | | | | | | | |
|---|---|---|---|---|---|---|---|---|---|---|---|---|---|---|
| Example | | 1 | 2 | 3 | 4 | 5 | 6 | 7 | 8 | 9 | 10 | 11 | 12[$] | 13[&] |
| BET surface area | m²/g | 152 | 162 | 148 | 159 | 153 | 187 | 108 | 154 | 146 | 152 | 153 | 148 | 153 |
| Av. aggregate surface area | nm² | 15751 | 12610 | 14352 | 16814 | 19651 | n.d. | n.d. | 21030 | 14357 | 23541 | 22145 | 12203 | 20034 |
| Average ECD | nm | 119 | 104 | 115 | 117 | 120 | n.d. | n.d. | 135 | 112 | 152 | 126 | 106 | 131 |
| Av. aggregate circumference | nm | 1334 | 1299 | 1213 | 1401 | 1651 | n.d. | n.d. | 1685 | 1288 | 1851 | 1754 | 1045 | 1517 |
| Average max. aggregate Ø | nm | 223 | 198 | 195 | 204 | 211 | n.d. | n.d. | 252 | 209 | 261 | 253 | 195 | 248 |
| Average min. aggregate Ø | nm | 137 | 123 | 128 | 139 | 152 | n.d. | n.d. | 158 | 129 | 170 | 161 | 121 | 153 |
| Average primary particle Ø | nm | 13 | 11 | 12 | 13 | 11 | n.d. | n.d. | 14 | 12 | 16 | 15 | 13 | 15 |
| C content | ppm | 6 | 9 | 9 | 10 | 9 | 11 | 4 | 1 | 10 | 11 | n.d. | n.d. | n.d. |
| Cl content | ppm | 14 | 12 | 8 | 12 | 16 | n.d. | n.d. | n.d. | n.d. | n.d. | n.d. | n.d. | n.d. |
| Thickening | Pas | 135 | 135 | 132 | 127 | 132 | n.d. | n.d. | 121 | 117 | 151 | 137 | 108 | 130 |
| Wetting time | sec | 88 | 184 | 114 | 152 | 104 | n.d. | n.d. | 288 | 651 | 1152 | 887 | 1253 | 938 |
| Dispersibility in silicone | | 1.5 | 1.5 | 1.5 | 1.5 | 1.5 | n.d. | n.d. | 1.5 | 1.5 | 2 | 2.5 | 2 | 2 |
| Surface finish | | 1.5 | 1.5 | 1.5 | 2 | 1.5 | n.d. | n.d. | 1.5 | 2.5 | 3 | 2.5 | 3.5 | 1.5 |

[$]N15, Wacker;
[&]Cabosil LM-50';
n.d. = not determined

The invention claimed is:

1. A composition comprising a pyrogenically produced silicon dioxide powder in the form of aggregates of primary particles, wherein the composition
    has a BET surface area of 150 ±15 m²/g and the aggregates display
    an average surface area of 12000 to 20000 nm²,
    an average equivalent circle diameter (ECD) of 90 to 120 nm and
    an average circumference of 1150 to 1700 nm.

2. The composition as claimed in claim 1, wherein the aggregates display
    an average surface area of 12500 to 14500 nm²,
    an average equivalent circle diameter of 95 to 110 nm and
    an average circumference of 1250 to 1450 nm.

3. The composition as claimed in claim 1, wherein a maximum aggregate diameter is between 170 and 240 nm and a minimum aggregate diameter is between 100 and 160 nm.

4. The composition as claimed in claim 1, wherein said composition has a chloride content of less than 250 ppm.

5. The composition as claimed in claim 1, wherein said composition has a carbon content of less than 100 ppm.

6. A process for the production of the silicon dioxide powder according to claim 1, wherein a mixture of silicon compounds is evaporated, separately or together, the vapours are transferred by means of a carrier gas to a mixing chamber, with
    $SiCl_4$ as the first component in a proportion of 60 to 95 wt.% relative to the mixture, and
    a second component is selected from the group consisting of $H_3SiCl$, $H_2SiCl_2$, $HSiCl_3$, $CH_3SiCl_3$, $(CH_3)_2SiCl_2$, $(CH_3)_3SiCl$, $(n-C_3H_7)SiCl_3$ and a mixture thereof in a proportion of 5 to 40 wt.%, relative to the mixture,
and a combustion gas and primary air, which can optionally be enriched with oxygen and/or be preheated, are transferred separately to the mixing chamber,
the mixture of the vapour of silicon chlorides, combustion gas and primary air is ignited in a burner and the flame burns into a reaction chamber,
secondary air, which surrounds the flame, is introduced into the reaction chamber, the ratio of secondary air to primary air being in a range from 0.05 to 3,
the solid is then separated from gaseous substances and the solid is then steam-treated at 250°C. to 750°C., wherein
the total amount of oxygen is at least sufficient for the complete combustion of the combustion gas and the silicon compounds and the amount of feed materials consisting of silicon compounds, combustion gas, primary air and secondary air is chosen such that an adiabatic flame temperature $T_{ad}$ of 1670 to 1730°C. is obtained, where $T_{ad}$ = the temperature of the feed materials+ the sum of the reaction enthalpies of the partial reactions/heat capacity of the substances leaving the reaction chamber, comprising silicon dioxide, water, hydrogen chloride, carbon dioxide, oxygen, nitrogen, and optionally the carrier gas if it is not air or nitrogen, taking the specific heat capacity of these substances at 1000°C. as a basis.

7. The process according to claim 6, wherein the temperature of the feed materials is 90°C. ±40°C.

8. The process according to claim 6, wherein the discharge velocity of the reaction mixture from the mixing chamber to the reaction chamber is 10 to 80 m/s.

* * * * *